US010928194B2

(12) United States Patent
Castaldini et al.

(10) Patent No.: US 10,928,194 B2
(45) Date of Patent: Feb. 23, 2021

(54) METHOD OF IDENTIFYING A COMMUNICATION PROTOCOL TO USE WITH A HOST DEVICE BY A PROBE

(71) Applicant: Marposs Societa' Per Azioni, Bentivoglio (IT)

(72) Inventors: Davide Castaldini, Santa Maria Codifiume, Argenta (FE) (IT); Paolo Lombardo, Bologna (IT); Roberto Bruni, Forlí (IT)

(73) Assignee: Marposs Societa' Per Azioni, Bentivoglio (IT)

( * ) Notice: Subject to any disclaimer, the term of this patent is extended or adjusted under 35 U.S.C. 154(b) by 317 days.

(21) Appl. No.: 16/097,926

(22) PCT Filed: May 3, 2017

(86) PCT No.: PCT/EP2017/060578
§ 371 (c)(1),
(2) Date: Oct. 31, 2018

(87) PCT Pub. No.: WO2017/191218
PCT Pub. Date: Nov. 9, 2017

(65) Prior Publication Data
US 2019/0137268 A1    May 9, 2019

(30) Foreign Application Priority Data
May 4, 2016   (IT) ................ 102016000045519

(51) Int. Cl.
*G01B 21/04* (2006.01)
*H04L 29/06* (2006.01)

(52) U.S. Cl.
CPC ............ *G01B 21/047* (2013.01); *H04L 69/18* (2013.01); *H04L 69/24* (2013.01); *G01B 2210/58* (2013.01)

(58) Field of Classification Search
USPC ........................................................ 702/122
See application file for complete search history.

(56) References Cited

U.S. PATENT DOCUMENTS

| 2004/0052308 A1* | 3/2004 | Palm ................... H04L 27/2614 375/222 |
| 2007/0076748 A1 | 4/2007 | Nakagawa |
| 2011/0222414 A1* | 9/2011 | Borsos .................. H04W 24/06 370/248 |

FOREIGN PATENT DOCUMENTS

| EP | 0 740 982 A2 | 11/1996 |
| WO | WO-2013/014168 A1 | 1/2013 |

\* cited by examiner

*Primary Examiner* — Paul D Lee
(74) *Attorney, Agent, or Firm* — Blank Rome LLP

(57) ABSTRACT

Method for self-recognition, by a probe, of a communication protocol to be used to communicate with a base station (7), the probe (4) being configured to emulate a plurality of communication protocols featuring respective activation procedures. Each activation procedure allows the base station to activate the probe to perform a checking cycle. According to the method, in consequence of a command given by a user by means of hardware interfaces (5,15,16) of the probe, the probe is set in a search state (100-105) where all the activation procedures are attempted and it is identified which of the activation procedures is completed positively. Then, the probe is switched to an operative state (201-205) based on the communication protocol featuring the identified activation procedure. Preferably, the activation procedure is identified after a predetermined number (N) of positive conclusions have occurred.

13 Claims, 3 Drawing Sheets

METHOD OF IDENTIFYING A COMMUNICATION PROTOCOL TO USE WITH A HOST DEVICE BY A PROBE

TECHNICAL FIELD

The present invention relates to a method for the identification, or self-recognition, by a probe of a communication protocol to be used to communicate with a base station.

In particular, the present invention can be applied advantageously but not exclusively to a touch probe used in a system for checking the position and/or dimensions of a mechanical piece, to which the following description will make explicit reference without losing generality.

BACKGROUND ART

Systems, comprising a base station and one or more touch probes, are known for checking the position and/or dimensions of a mechanical piece, each probe including a movable arm adapted to be deflected upon contact with the mechanical part, a switch that can be operated by deflecting the arm for generating an electric signal and transceivers means for communicating information related to this electric signal to the base station. The base station processes the information to perform the desired checking on the mechanical piece.

Essentially for cost reasons, a possible typical scenario of use in the field is a system comprising different types of probes provided by different manufacturers which coexist with each other and communicate with the same base station. In fact, the base station is fixed to a machine where the mechanical piece to be checked is placed, and it is more expensive to replace, while the probes are mobile and are more frequently replaced. For this purpose, some probes may be designed to emulate the most widely used protocols in the specific technical field, and must be configured before the first use so that they can communicate with a specific communication protocol. In particular, the initial configuration of each probe requires a specific intervention of a user in a dedicated programming phase, for example by acting on suitable mechanical commands, or dip-switches, or appropriately deflecting the arm according to specific programming cycles, or by using an advanced base station. However, the intervention by the user is often laborious, for example because it requires specialized knowledge of the particular use of the advanced base station.

DISCLOSURE OF THE INVENTION

Purpose of the present invention is to provide a probe, which is free from the drawbacks described above and, at the same time, is easy and inexpensive to manufacture.

The present invention provides a method for the identification, or self-recognition, by a probe, of a communication protocol to be used to communicate with a base station, and a probe for a system for checking position and/or dimensions of a mechanical piece, as defined in the appended claims.

BRIEF DESCRIPTION OF THE DRAWINGS

The present invention is now described with reference to the accompanying drawings, given by way of non-limiting example, wherein.

BEST MODE OF CARRYING OUT THE INVENTION

Figure 1:
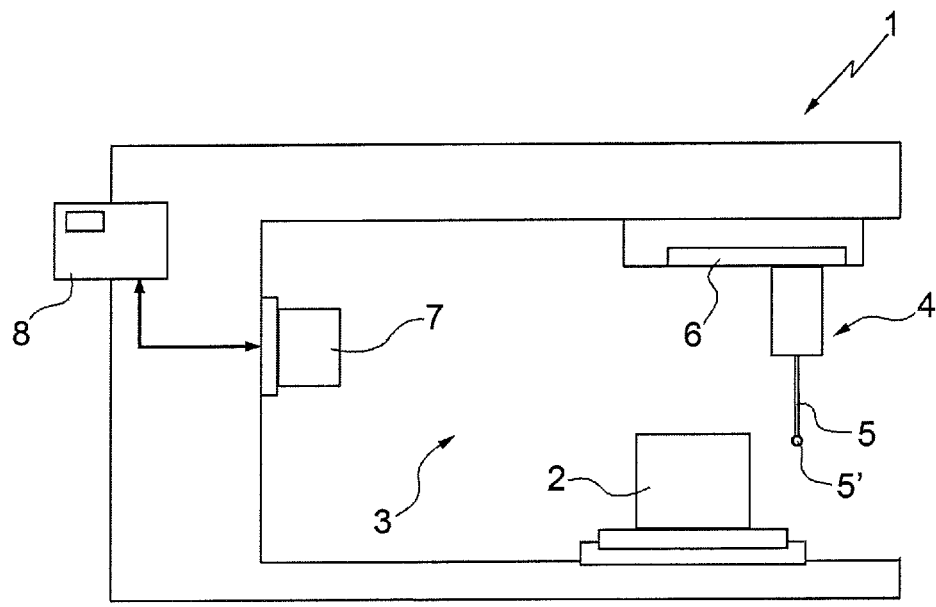
FIG. 1 shows, in a schematic way, a system for checking position and/or dimensions of a mechanical piece, the system comprising a probe operating according to the present invention.

In FIG. 1, reference number 1 indicates, as a whole, a machine for machining a mechanical piece 2 and reference number 3 indicates a checking system installed on the machine 1 to check the position and/or dimensions of the mechanical piece 2 placed in the machine 1. The checking system 3 comprises at least one touch probe 4, which is provided with a movable arm 5 carrying a feeler 5' and a transducer, or switch, marked with the reference number 14 in FIG. 2, for detecting the touch between the feeler 5' and the mechanical piece 2. The probe 5 is mounted on the machine 1 so as to be able to move, for example by means of slides 6, in the area where the mechanical part 2 is placed. The checking system 3 also includes a base station 7, which is fixed to the machine 1, in particular to the base of the machine 1, is interfaced with a numerical control unit 8 of the machine 1 and is configured to communicate with a preset remote communication protocol of a known type, which is based in particular on the transmission and reception of optical signals, preferably of infrared radiation modulated in amplitude having a certain carrier frequency. The communication between the base station 7 and the probe 4 is typically a wireless communication.

Figure 2:
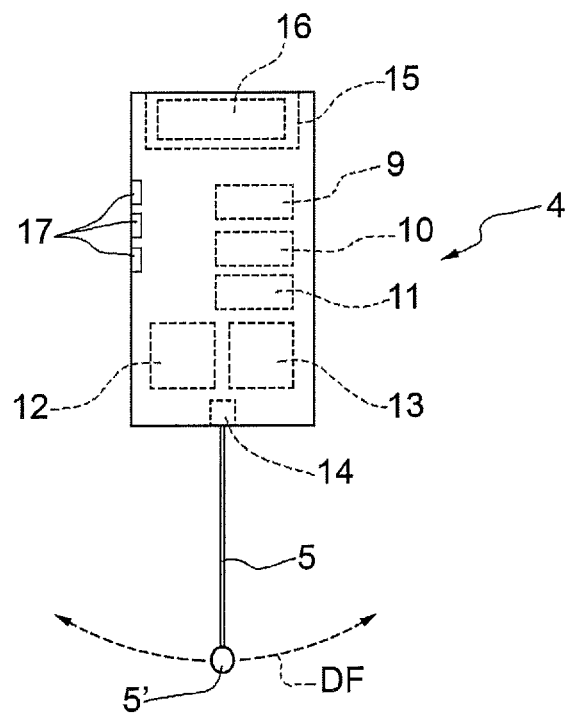
FIG. 2 schematically shows in greater detail parts of the probe of FIG. 1.

With reference to FIG. 2, the probe 4 comprises an optical infrared transceiver comprising a transmitter 9 capable of transmitting infrared radiation signals modulated by a frequency which can reach a few hundred kHz, a first receiver 10 adapted to receive high frequency modulated infrared signals, i.e. signals having a frequency between 350 and 570 kHz, and a second receiver 11 adapted to receive low frequency infrared modulated signals, i.e. signals having a frequency between 7 and 15 kHz. The presence of two separate receivers is not an essential feature of the present invention. For example, a single, suitably configurable receiver can be used.

The probe 4 comprises processing and control devices including, for example, a microcontroller 12 and an FPGA device 13 cooperating with each other and configured to control the transmitter 9 and the receivers 10 and 11 in such a way that the probe 4 can emulate a plurality of per se known communication protocols, these protocols comprising the communication protocol of the base station 7 that is not a priori known to the probe 4. Each of said communication protocols has its respective activation procedure that enables the base station 7 to activate the probe 4 to perform a checking cycle of the mechanical piece 2.

The communication protocols emulated by the probe 4 splits essentially in two categories featuring two different types of activation procedure, both per se known. The activation procedure of the first category of communication protocols, or first activation procedure, is as follows: the probe 4 periodically transmits a respective beacon signal on different physical and logical communication channels and the base station 7 responds to the beacon signal on a certain channel with an activation signal when it wants to activate the probe 4 to perform a checking cycle. The activation procedure of the second category of communication protocols, or second activation procedure, is as follows: the base station 7 directly transmits its respective activation signal when it wants to activate the probe 4 to perform a checking cycle. The activation signal consists of one or more modulated infrared signal bursts, the modulating frequency and the length of the signal burst(s) of the signal being predetermined. The second category of protocols can split in several groups of protocols. Each group is characterized by a specific modulating frequency of the signal and comprises protocols which differ among them for specific sequences of signal bursts, where a sequence may also include only one burst.

By way of example, the first category of communication protocols includes, among others, a protocol characterized by the transmission and reception of high frequency modulated signals, i.e. signals having a frequency between 350 and 570 kHz, through multiple physical and logical channels. Still by way of example, the second category of communication protocols includes, among others, a protocol characterized by the transmission of baseband signals, that is signals consisting of pulses of a certain length substantially not modulated, and the reception of low frequency modulated signals, i.e. signals having a frequency between 10 and 11.9 kHz.

The switch 14 is mechanically connected to the arm 5 and is interfaced with the microcontroller 12 to detect the deflection of the arm 5 with respect to a rest position, which is that one shown in FIG. 2. When the arm 5 is deflected, it performs a displacement, marked with DF in FIG. 2, with respect to the housing of the probe 4. The probe 4 also includes a compartment 15 for housing and connecting electrically at least one power supply battery 16 and one or more LEDs 17 to indicate the operating status of the probe 4 to a user.

Typically, the structure of the probe 4 is such as to guarantee a high degree of protection against the penetration of dust and liquids. For this reason, hardware interfaces between the probe 4 and the user are minimized. For example, normally the probe 4 does not have any power button: it turns on—generally in a reduced power state or stand-by condition—as soon as the battery 16 is inserted into the compartment 15. Thus, the hardware interfaces between the user and the probe 4 essentially comprise the compartment 15, the arm 5 and the LEDs 17.

Normally, the probe 4 is configured to communicate with a specific preset communication protocol, which may be the default protocol selected by the manufacturer (every probe is created with a basic configuration—typically, the probe 4 is configured to communicate with a communication protocol of the first category) or a protocol that was previously programmed by the user or configured in the field. In other words, when it is turned on, the probe 4 expects to receive an activation signal—that is a signal to move from the stand-by condition to a fully operative condition—according to the preset communication protocol.

However, the base station 7 may communicate with a different protocol from that one preset in the probe 4.

Figure 3:
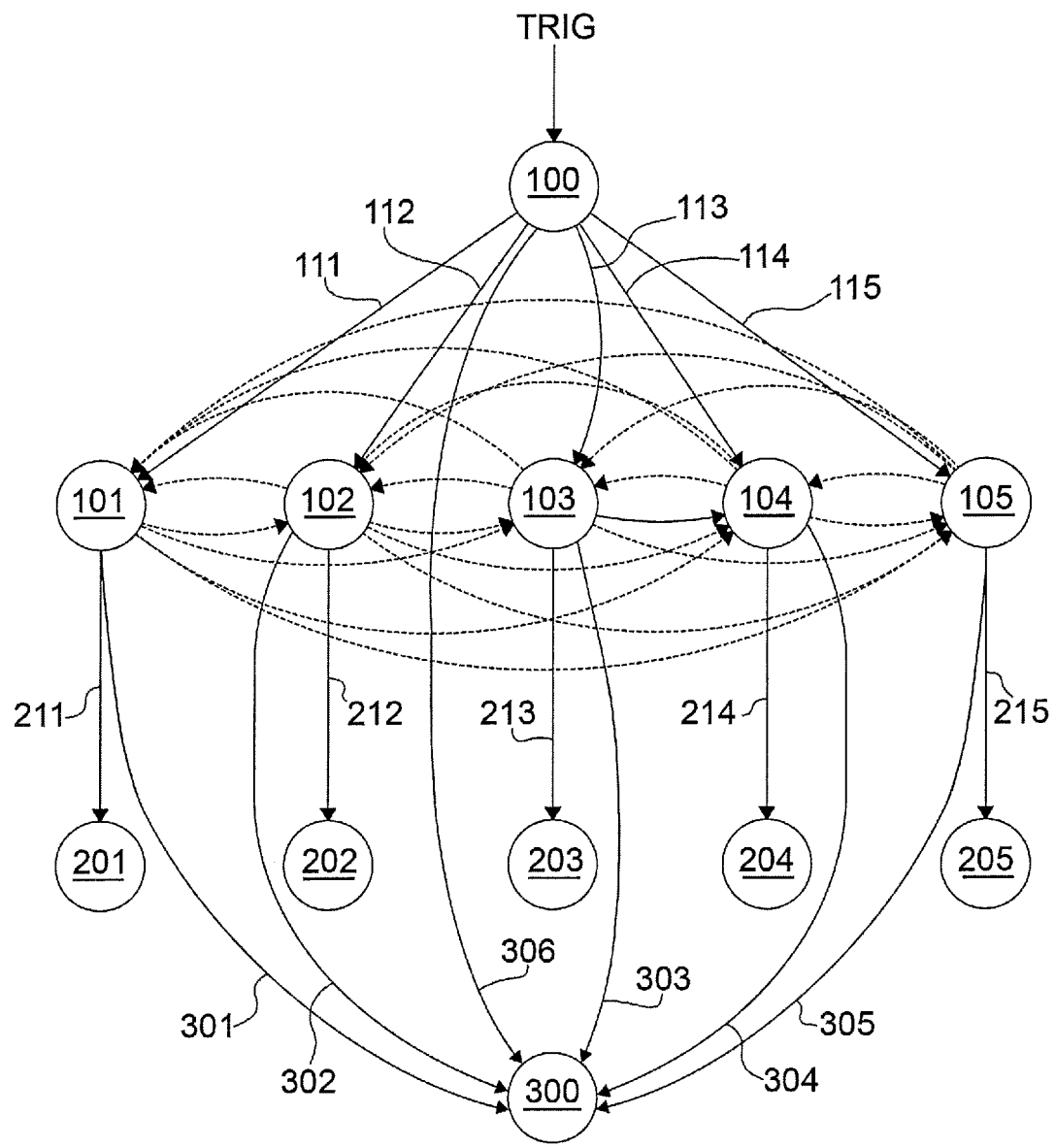
FIG. 3 shows a state diagram relating to the operation of the probe of FIG. 2 according to the method of the present invention.

With reference to the state diagram of FIG. 3, according to the invention the microcontroller 12 is configured to detect a command given by the user by means of the hardware interfaces, in particular a specific event marked with TRIG in FIG. 3, and consequently set the probe 4 in an initial search state 100 where all activation procedures of the different communication protocols are attempted and it is identified which of them is completed positively. The specific event TRIG that is detected can consist, for example, in inserting the battery 16 into the compartment 15 concurrently with a deflection of the arm 5.

As soon as any one of the activation procedures ends positively, the microcontroller 12 switches the probe 4 (transition marked with 111, 112, 113, 114, 115 in FIG. 3) to an advanced search state marked with 101, 102, 103, 104, 105 associated with the communication protocol featuring the activation procedure that ended positively. The number of the advanced search states 101-105 is indeed equal to the number of communication protocols emulated by the probe 4, which are five in the example of FIG. 3.

Moreover, in each of the advanced search states 101-105 all activation procedures are attempted by the probe 4, when it is in stand-by condition, in order to verify if any of them and which of them ends positively. In each of the advanced search states 101-105 the microcontroller 12 counts the positive conclusions of that specific activation procedure and as soon as the count reaches a predetermined number N, then the microcontroller 12 switches the probe 4 (transitions or commutations 211, 212, 213, 241, 251) to a respective operative state 201, 202, 203, 204, 205 associated with the communication protocol featuring such activation procedure. In each of the operative states 201-205 the probe 4 can perform its own checking cycle by communicating with a base station via its respective communication protocol.

In a preferred embodiment, the commutations 211-215 occur when the number N of positive conclusions of the relative activation procedure are consecutive. In each of the advanced search states 101-105, if the successful conclusion of an activation procedure relating to a communication protocol associated to another advanced search state 101-105 occurs, the microcontroller 12 stops counting the number of activation procedures relating to the current advanced search state and switches the probe 4 to the other advanced search state (transitions marked with a dashed line and not indicated with any reference number in FIG. 3). According to a preferred embodiment, the preset number N is equal to three. Different preset numbers N can be provided in different embodiments. The positive conclusions of the activation procedure may be consecutive or not.

In particular, according to a preferred embodiment, each of the commutations 211-215 is performed if each of the positive conclusions of the relative activation procedure after the first one occurs within a predetermined time interval T from the previous one. For example, the time interval T is equal to one hour. If, when the predetermined time interval T from the previous positive conclusion expires, no new activation procedure having a positive conclusion occurred, the probe 4 is switched to a default state 300. In particular, in case that N is equal to three, if upon the expiry of the time interval T from the first, or from the second successful conclusion of an activation procedure no new activation procedure has been completed successfully, the microcontroller 12 causes the probe 4 to exit from any of the search states 100-105 in which it is at that time, and preferably switches the probe 4 (transitions 301, 302, 303, 304, 305, 306) to a default state 300. The default state 300 corresponds, for example, to the operative state associated to the preset communication protocol of the probe 4, or to an operative state set prior to the entry of the probe 4 into the initial search state 100.

Figure 4:
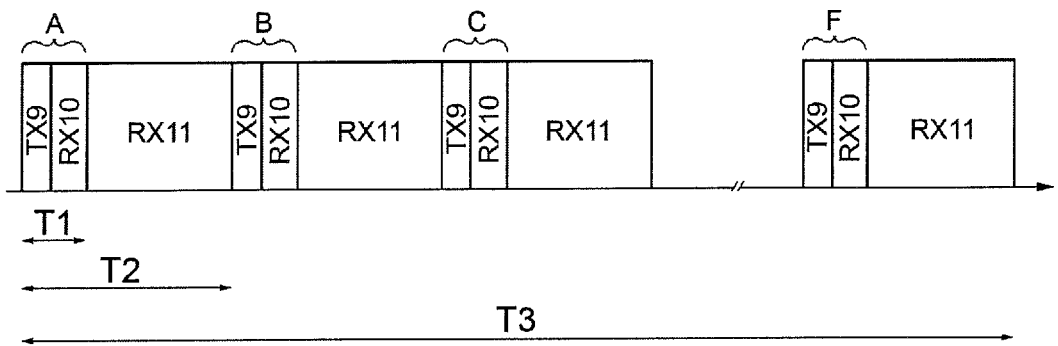
FIG. 4 shows a time diagram relating to the operation of the probe of FIG. 2 in some of the states of the FIG. 3 diagram.

In each of the search states 100-105, the microcontroller 12 controls the transmitter 9 and the receivers 10 and 11 according to a time division multiplexing scheme illustrated in FIG. 4, in order to attempt all the activation procedures of the communication protocols that can be emulated by the probe 4. In the example of FIG. 4, the communication protocol associated to the first pair of states 101 and 201 belongs to the first category of protocols previously cited and provides six communication channels marked with A, B, C, D, E, F, while the communication protocols associated with the other four pairs of states (102 and 202, 103 and 203, 104 and 204, 105 and 205) belong to the second category of protocols. The communication channels A-F include, for example, three physical channels and two logical channels for each physical channel.

With reference to FIG. 4, in the search states 100-105 the microcontroller 12 selects—for example, by activating them—the transmitter 9 and the receiver 10 periodically, according to the time division scheme, on the different communication channels A-F of the communication protocol of the first category, for transmitting—as provided by that kind of protocol—the beacon signal on one communication channel at a time and, immediately after the transmission, listens to the same communication channel to receive in response the possible activation signal that determines the successful conclusion of the relative activation procedure. In other words, the time division multiplexing provides a time slot T1 assigned to the protocol of the first category and repeated with a period T2, in which the transmitter 9 and the receiver 10 are selected in a sequential and complementary manner. In other words, in a first part of each slot T1, indicated with TX9, the transmitter 9 is selected on a specific channel to transmit the beacon signal while the receiver 10 is deselected, and in a second part of each T1 slot, marked with RX10, the transmitter 9 is deselected, in particular deactivated, while the receiver 10 is selected on that specific communication channel.

The overall length T3 of the time division multiplexing is substantially equal to the product between the period T2 and the number of communication channels A-F. By way of example, the length of the time slot T1 is within 2 and 3 ms, the period T2 is substantially equal to 100 ms and, therefore, the length T3 is substantially equal to 600 ms.

In the time interval between two successive transmissions of the beacon signal, the time interval being marked with RX11 and having a length substantially equal to the difference between the period T2 and T1 slot, the microcontroller 12 selects the second receiver 11 to listen in the low frequency band in order to receive the possible activation signal relating to any of the other four communication protocols belonging to the aforementioned second category of protocols.

The microcontroller 12 is configured to identify the activation signal possibly received by the receiver 11, that is to identify to which of the four protocols (receivable by the receiver 11) the received activation signal belongs, on the basis of the frequency and sequence of signal bursts of the received activation signal. For this purpose, the microcontroller 12 cooperates in a known manner with the receiver 11 in such a way as to detect first the frequency of the received signal and then the length of every signal burst so as to determine the sequence of signal bursts.

Figure 5:
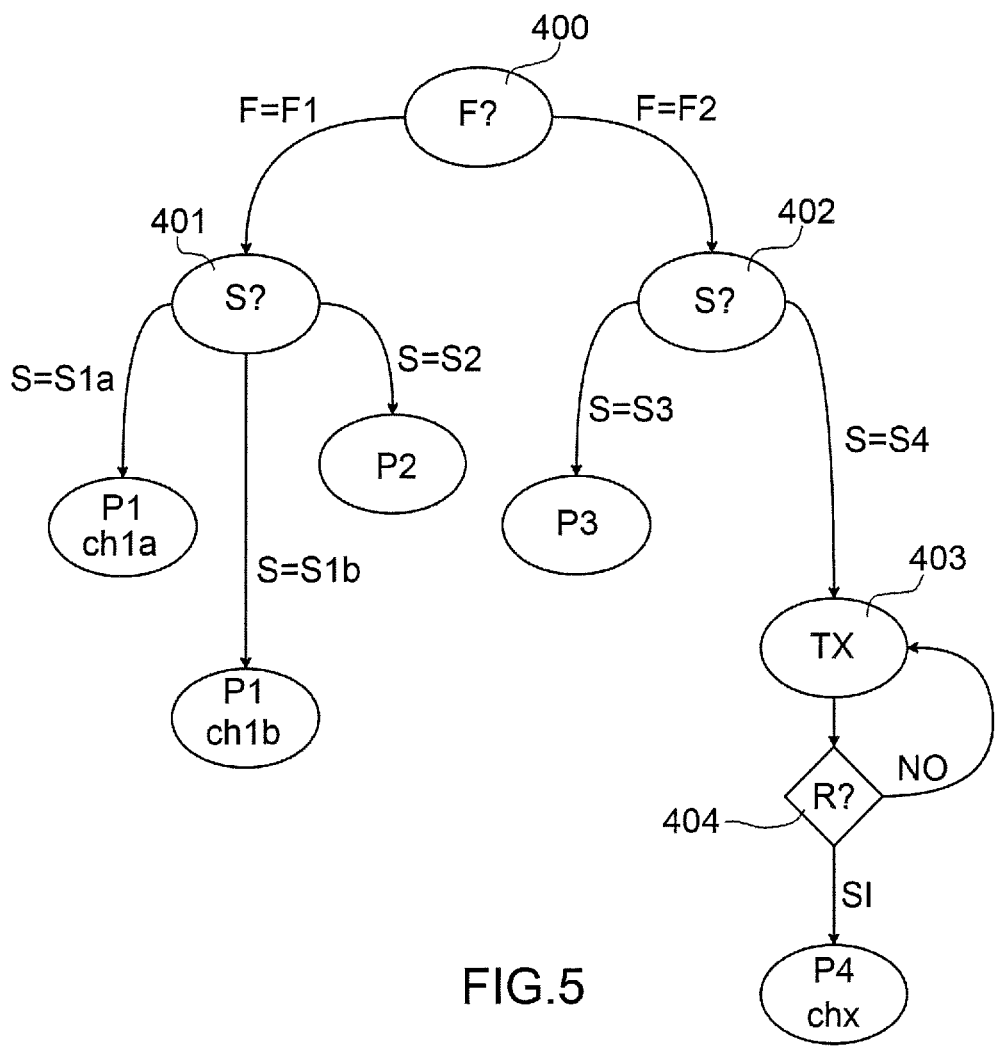
FIG. 5 illustrates a decision tree diagram relating to the operation of the probe of FIG. 2 in some of the states of the diagram of FIG. 3.

FIG. 5 illustrates, in a simplified manner, a tree diagram implemented by the microcontroller 12 to identify the activation signal. With reference to FIG. 5, the frequency of the signal F received by the receiver 11 is compared with the two possible frequencies F1 and F2 of the above four communication protocols (node 400). For each value of the frequency F, the sequence S of signal bursts of the received signal is compared with all the possible sequences of signal bursts on that frequency (nodes 401 and 402). The possible sequences on the frequency F1 are indicated with S1a, S1b and S2, and those on the frequency F2 are indicated with S3 and S4. In particular, the above comparison between sequences of signal bursts consists in a comparison between the lengths of the signal bursts of the sequence S and the lengths of the signal bursts of the possible sequences S1a, S1b, S2, S3 and S4.

The decision tree of FIG. 5 allows to identify the activation signal by a process of elimination. The identification of the activation signal concludes positively the relative activation procedure and thus identifies the communication protocol used by the base station 7 among the protocols P1-P4 belonging to the second category of protocols emulated by the probe 4.

In the example of FIG. 5, the protocol P1 includes two logical channels ch1A and ch1b identified by two different sequences of signal bursts S1a and S1b. The protocol P4 comprises a plurality of logical channels identified by respective signal burst sequences transmitted by the transmitter 9, and the logical channel to be used requires a confirmation from the base station 7. Therefore, the microcontroller 12 controls the transmitter 9 to transmit according to the time division scheme all the possible sequences of signal bursts (block 403) and the receiver 11 to wait for and receive a confirmation signal R (block 404) from the base station 7 in order to identify the logical channel (chx).

Therefore, the above described procedure enables the probe 4 to identify and recognize the communication protocol used by the base station 7 in an autonomous and automatic way, with no need for a preliminary inquiry and selection phase of the communication protocol.

The above described method has the advantages that it can be implemented in a probe 4 having a per se known hardware and it doesn't require an explicit and complex configuration by the user thanks to the possibility of setting the probe 4 in a search mode by giving a command by means of the hardware interfaces. Such command corresponds to the occurrence of a simple event, such as the insertion of the battery 16 in its compartment 15 concurrently with a deflection of the arm 5. This is, however, only a possible way to activate the search mode. The search mode may indeed be activated in a different way, by detecting equally simple events such as the pressure on a specific button, placed, for example, in the compartment 15, or the insertion of the batteries with reversed polarity, or an appropriate sequence of deflections of the arm.

To avoid downtime, the probe 4 may also be configured in such a way that it is fully operational, that is it can perform a checking cycle of the mechanical piece 2, after any—including the first one—of the activation procedures is completed. In other words, the probe 4 can perform a checking cycle when it is still in one of the advanced search states 101-105. The method of self-recognition to search the correct and final communication protocol, according to the diagram of FIG. 3, continues as soon as the probe 4—still remaining in the advanced search state 101-105—returns to the stand-by condition.

According to the preferred embodiment described above, a predetermined number N of positive activation conclusions counted by the microcontroller to move the probe 4 from the advanced search state 101-105 to the operative state 201-205 is set, for example equal to three. However, in order to speed up the self-recognition process the probe 4 may be configured in such a way so as to move from the initial search state 100 directly to the operative state 201-205 as soon as the first positive conclusion is detected.

In other words, according to the invention the probe 4 can be switched directly to the operative state 201-205 upon detection of at least one positive conclusion of a certain activation procedure.

The self-recognition method starts again when a new specific event TRIG is detected.

Typically, the probe 4 emulates communication protocols of both the categories described above. However, if needed, it can be configured in such a way as to emulate only one of the categories of communication protocols, either the first one or the second one.

The invention claimed is:

1. A method for identifying, by a probe, a communication protocol to be used to communicate with a base station, the probe comprising control and processing devices configured to emulate a plurality of communication protocols featuring respective activation procedures, each activation procedure allowing the base station to activate the probe to perform a checking cycle; the method comprising:
   detecting a command given by the user using interfaces of the probe and consequently setting the probe in a search state,
   in the search state, attempting the activation procedures,
   detecting at least one positive conclusion of one of the activation procedures,
   identifying the communication protocol featuring said one of the activation procedures as the communication protocol to be used, and
   switching the probe to an operative state associated with the identified communication protocol.

2. The method according to claim 1, wherein a predetermined number of detected positive conclusions of said one of the activation procedures is set.

3. The method according to claim 2, wherein the predetermined number of detected positive conclusions is three.

4. The method according to claim 2, wherein the positive conclusions of said predetermined number are consecutive to one another.

5. The method according to claim 2, wherein the probe is switched to said operative state where each of said positive conclusions after the first one occurs within a predetermined time interval from the previous positive conclusion.

6. The method according to claim 5, comprising:
   switching the probe to a default state if, when the predetermined time interval from the previous positive conclusion expires, no new activation procedure having a positive conclusion occurred.

7. The method according to claim 1, wherein said activation procedures comprise a first activation procedure, according to which the probe periodically transmits a respective beacon signal on different communication channels and the base station responds to the beacon signal with an activation signal, and a second activation procedure, according to which the base station directly transmits a respective activation signal; the probe comprising a transmitter and a first and a second receiver; the step of detecting one of said activation procedures having a positive conclusion, comprising:
   periodically, according to a time division scheme, on different communication channels selecting the transmitter and the first receiver, in a sequential and complementary way, to transmit said beacon signal and then receive in response a relative activation signal according to the first procedure; and
   selecting the second receiver in the time intervals elapsing between two successive transmissions of the beacon signal to receive the activation signal according to the second procedure.

8. The method according to claim 7, wherein the activation signal of said second procedure comprises at least one signal burst having predetermined frequency and length; the step of detecting one of said activation procedures having a positive conclusion, comprising:
   detecting frequency and sequence of said at least one burst of the activation signal received by said second receiver; and
   identifying the activation signal on the basis of the detected frequency and the detected sequence.

9. The method according to claim 1, wherein said probe (4) is a touch probe to—wherein said probe is a touch probe comprising a movable arm which carries a feeler and is adapted to be deflected by the touch between the feeler and a mechanical piece, a switch operable by the deflection of said arm and a compartment for housing at least one supply battery; the probe being switched to an initial search state when the arm is kept deflected during insertion of the battery into said compartment.

10. The method according to claim 1, wherein the communication between the base station and the probe is a wireless communication.

11. The method according to claim 1, wherein said probe comprises an optical transceiver to communicate with said base station via optical signals.

12. The method according to claim 11, wherein said optical transceiver is an infrared radiation transceiver, to communicate with said base station via infrared radiation signals.

13. A probe for a checking system for checking the position or the dimensions of a mechanical piece, the probe comprising a transceiver for communicating with a base station of the checking system and processing and control devices configured to implement the method according to claim 1.

* * * * *